March 23, 1954     E. J. DILLMAN     2,672,883

METERING VALVE

Filed Aug. 31, 1949

INVENTOR.

Earnest J. Dillman

BY Andrew K. Foulds his ATTORNEY

Patented Mar. 23, 1954

2,672,883

UNITED STATES PATENT OFFICE 2,672,883

METERING VALVE

Earnest J. Dillman, Detroit, Mich., assignor to Detroit Controls Corporation, a corporation of Michigan Application August 31, 1949, Serial No. 113,323

4 Claims. (Cl. 137—588)

This invention relates to new and useful improvements in metering valves and more particularly to a metering valve having a quill-like construction.

One of the objects of this invention is to provide a metering valve of new and improved construction.

Another object is to provide a hollow cylindrical metering valve having a slanted or quill-like metering tip.

Other objects will become apparent from time to time throughout the specification and claims as hereinafter related.

This invention consists in the new and improved metering valve construction which will be described more fully hereinafter and the novelty of which will be particularly pointed out and distinctly claimed.

In the accompanying drawings to be taken as part of this specification there is clearly and fully illustrated a preferred embodiment of this invention in which drawing—

Figure 1:
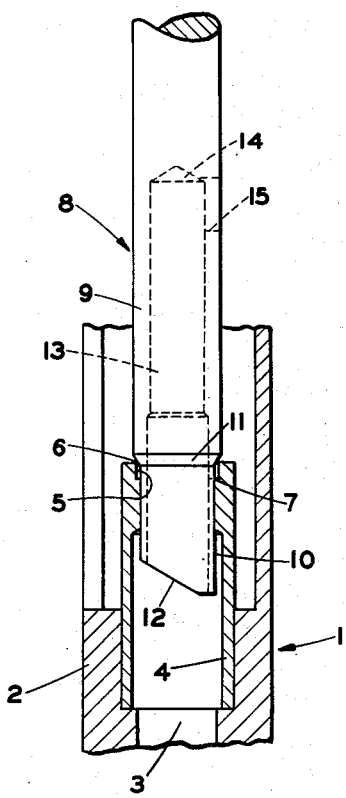
Figure 2:
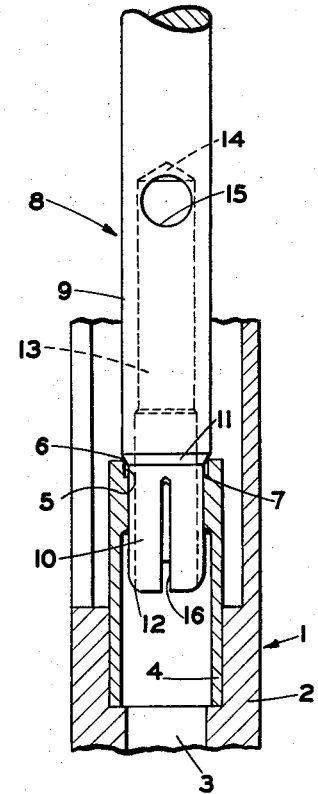

Figure 1 is a view in side elevation of this improved metering valve and showing the valve port and valve seat portions in longitudinal section, and Fig. 2 is a view in right elevation of the metering valve shown in Fig. 1 showing the metering slot and the metering stem and showing the valve seat and port in section.

Referring to the drawings by characters of reference there is shown in Figs. 1 and 2 a broken section of the side and bottom wall of a valve casing generally designated as 1. This valve would in commercial practice have its greatest application as the metering control valve for controlling flow of liquid fuel to a liquid fuel burner from a constant level chamber. In the bottom wall 2 of the casing 1 there is an outlet passage 3 having a valve seat member 4 positioned therein providing a valve port. At the upper end of the valve seat member 4 there is an annular recess 5 providing upper and lower shoulders 6 and 7 respectively. There is a valve member 8 which controls flow from the chamber enclosed by the casing 1 (which chamber is not shown). The valve member 8 is of cylindrical construction and has an upper portion 9 of larger exterior diameter and a lower portion 10 of smaller exterior diameter. There is an inter-connecting beveled portion 11 between the upper and lower portions 9 and 10 providing a valve portion seating on the upper shoulder 6 when the valve is in closed position. The lower valve portion 10 has its end cut off as at 12 at an acute angle relative to the cylindrical axis of the valve stem. It should be noted that subsequent reference in the specification and claims to the valve stem being cut off at an acute angle is intended to define both straight and arcuate or irregular cuts which form a "quill-like" point substantially as shown. The valve member 8 has a center bore 13 extending through the smaller end portion 10 into the larger portion 9 and terminating as at 14 at a point above the maximum level of liquid in the casing 1. In the upper valve portion 9 there is provided a vent opening or passage 15 adjacent the end portion 14 of the bore 13. There is a metering passage or slot 16 (see Fig. 2) which extends from a point just below the beveled valve portion 11 to the tip of the smaller valve portion 10 along the longer edge of the portion 10 defined by the longest elements of the cylindrical surface thereof.

In operation this valve functions generally as follows: When the chamber enclosed by the casing 1 has liquid fuel such as fuel oil therein and it is desired to open the valve for flow of fuel through the outlet passage 3, the valve stem 8 is lifted by any conventional valve opening means and as the beveled valve portion 11 is moved away from the shoulder 6 oil is permitted to flow into the annular recess 5 and through the metering slot 16 for discharge into the outlet passage 3. The amount of fuel flowing through the passage 3 will be determined by the amount of opening of the valve member and the liquid head therein. In the past valves such as are shown herein have been used for metering the flow of fuel to burners except that the lower tip portion 12 of the valve has been cut off at right angles to the cylindrical axis thereof. It has been found that such valves give occasional trouble by formation of bubbles at the end portion 12 of the valve discharging into the outlet passage 3. This formation of bubbles at the end of the valve will cause an erratic condition of flow so that the valve cannot be depended upon to deliver the quantity of fuel per unit time for which it is set when used with very low liquid fuel heads as in conventional fuel metering valves. It has been found that by cutting the end of the valve at an angle as at 12 and placing the metering slot 16 along the longer edge of the valve portion 10 this bubble formation can be completely eliminated. It is believed that the elimination of bubble formation by this type of valve construction results from two conditions. Firstly, the valve construction tends to feed the oil along the metering slot to the relatively sharp tip where it falls off as drops and cannot develop a surface film for bubble formation, this action being somewhat analogous to that of the fountain pen. Secondly, it is believed that the bubble formation is eliminated because of the additional cross sectional area provided for the valve. This type of valve as used in fuel metering equipment is of standard size and is relatively close in size to the critical area which is so related to the surface tension of the oil as to facilitate the formation of bubbles. In the experiments that led to the development of this valve it was found that if the slanted tip were not used the bubble formation could be eliminated by using a larger diameter valve which, however, would necessitate the scrapping of large quantities of commercial valves already constructed. It is believed that the slanted cut on the end of the valve portion 10 in addition to providing a feeding action similar to that of a fountain pen provides an increased cross-sectional area which is just beyond the critical area for bubble formation and therefore produces the result desired. Whether or not either of these theories of operation are correct is not directly material to this invention since the valve as constructed produces the desired result.

It will be obvious to those skilled in the art that various modifications may be made of this invention without departing from the scope thereof as heretofore described and as set forth in the appended claims.

What is claimed and is desired to be secured by Letters Patent of the United States is:

1. In a metering valve, a wall member having a valve port opening therethrough, a hollow cylindrical valve member having one end cut off at an acute angle relative to the cylindrical axis thereof, said valve member being slidably positioned in said valve port with said one end extending therethrough, and said valve member having a metering slot along the longest extending surface of said one end.

2. In a metering valve, a wall member having a valve seat portion with a valve port opening therethrough, said valve seat portion having an annular recess at the upper end of said valve port providing upper and lower annular shoulders, a valve member having hollow cylindrical portions of different exterior size with a beveled valve portion interconnecting them, one of said valve member portions slidably fitting and extending through said valve port and having an open end, said valve member having said beveled portion seating on the upper one of said shoulders when in a closed position, the end of said one valve member portion being cut off at an acute angle relative to the axis of the valve member, and said one valve member portion having a metering slot in the wall thereof extending from a point just below said beveled portion to the lower end thereof along the longest element of the cylindrical surface thereof.

3. In a metering valve, a wall member having a valve seat portion with a valve port opening therethrough, said valve seat portion having an annular recess at the upper end of said valve port providing upper and lower annular shoulders, a valve member having hollow cylindrical portions of different exterior size with a beveled valve portion interconnecting them, one of said valve member portions slidably fitting and extending through said valve port and having an open end, said valve member having said beveled portion seating on the upper one of said shoulders when in a closed position, the end of said one valve member portion being cut off at an acute angle relative to the axis of the valve member, said one valve member portion having a metering slot in the wall thereof extending from a point just below said beveled portion to the lower end thereof along the longest element of the cylindrical surface thereof, and the hollow upper portion of said valve member having a side wall vent opening.

4. As an article of manufacture, a metering valve comprising a cylindrical member having upper and lower portions of larger and smaller exterior diameter respectively and a beveled interconnecting portion, said member having a bore extending from the smaller portion into and terminating in the larger portion, a vent passage in the wall of said larger portion at the end of said bore, said smaller portion having its end cut off at an acute angle relative to its cylindrical axis, and said smaller portion having a metering slot in the wall thereof extending through substantially the entire length thereof along the longest cylindrical element of the surface thereof.

EARNEST J. DILLMAN.

References Cited in the file of this patent

UNITED STATES PATENTS

| Number | Name | Date |
|--------|------|------|
| 485,358 | Soderin | Nov. 1, 1892 |
| 1,988,819 | Stuart | Jan. 27, 1935 |
| 2,079,348 | Hann | May 4, 1937 |
| 2,244,161 | Johnson | June 3, 1941 |
| 2,344,590 | Breese | Mar. 21, 1944 |

FOREIGN PATENTS

| Number | Country | Date |
|--------|---------|------|
| 23,347 | Great Britain | of 1902 |
| 379,779 | France | of 1907 |
| 860,180 | France | of 1940 |